US005203389A

United States Patent [19]

Goodwin

[11] Patent Number: 5,203,389

[45] Date of Patent: Apr. 20, 1993

[54] PRECISION WOOD-JOINT MAKING FIXTURE APPARATUS AND METHOD OF USE WITH A ROUTER

[76] Inventor: Edward J. Goodwin, 1655 W. Ajo #681, Tucson, Ariz. 85713

[21] Appl. No.: 972,767

[22] Filed: Nov. 6, 1992

[51] Int. Cl.⁵ .......................... B27B 1/00; B23C 1/20; B23C 5/10

[52] U.S. Cl. ...................................... 144/356; 83/574; 144/134 R; 144/134 D; 144/136 R; 144/136 C; 144/371; 409/182

[58] Field of Search ............... 409/125, 137, 182, 248; 83/574; 144/134 R, 134 A, 134 D, 136 R, 136 C, 356, 371, 372

[56] References Cited

U.S. PATENT DOCUMENTS

| | | | |
|---|---|---|---|
| 2,752,961 | 7/1956 | Melgaard | 144/136 |
| 2,756,785 | 7/1956 | Godfrey | 144/134 |
| 4,114,664 | 9/1978 | Cotton | 144/134 |
| 4,185,671 | 1/1980 | Cotton | 144/134 |
| 4,281,694 | 8/1981 | Gorman | 144/136 C |
| 4,434,824 | 3/1984 | Bussey | 144/134 |
| 4,735,531 | 4/1988 | Boerckel et al. | 409/182 |
| 4,946,149 | 8/1990 | Greene | 269/21 |
| 5,080,152 | 1/1992 | Collins et al. | 144/136 C |

OTHER PUBLICATIONS

Leigh Woodworking Jigs and Accessories Catalog 1992 pp. 4–10, The Grizzly Imports, Inc. Catalog 1991 pp. 49, 67, 70, 99, 100, 101, 102, Woodsmith Fall Catalog No. 70 1990 p. 15.

The Grizzly Press 1992 Summer vol. 2 No. 1 p. 16, The Woodworker's Store Catalog 1990–1992 Catalog pp. 73 and 74.

*Primary Examiner*—W. Donald Bray

*Attorney, Agent, or Firm*—Victor Flores

[57] ABSTRACT

A multi-purpose woodworking fixture having structure for facilitating precision-controlled positioning of a woodworking tool, such as a router, about a wood workpiece for cutting wood-joint cuts, wood molding, or geometric designs. The fixture facilitates making a variety of the common wood-joints including dovetail joints, box joints, dado joints, dovetail-dado joints, rabbet joints, combination rabbet and dado joints, mortise and tenon joints, mortise and mortise joints, biscuit joints, lap joints, cross lap joints, end lap joints, dowel joints, spline joints, tongue and groove joints and stile and rail joints. The fixture features a router carriage, a detachable calibrated router positioning mechanical attachment for positioning the router in the X-direction and Y-directions and which complements the router's adjustment in the Z-direction. The fixture enhance the router's capabilities for controllably working on the workpiece, either in a freehand manner or by using the calibrated router positioning mechanical attachment, either manually or with an optional motorized means.

18 Claims, 7 Drawing Sheets

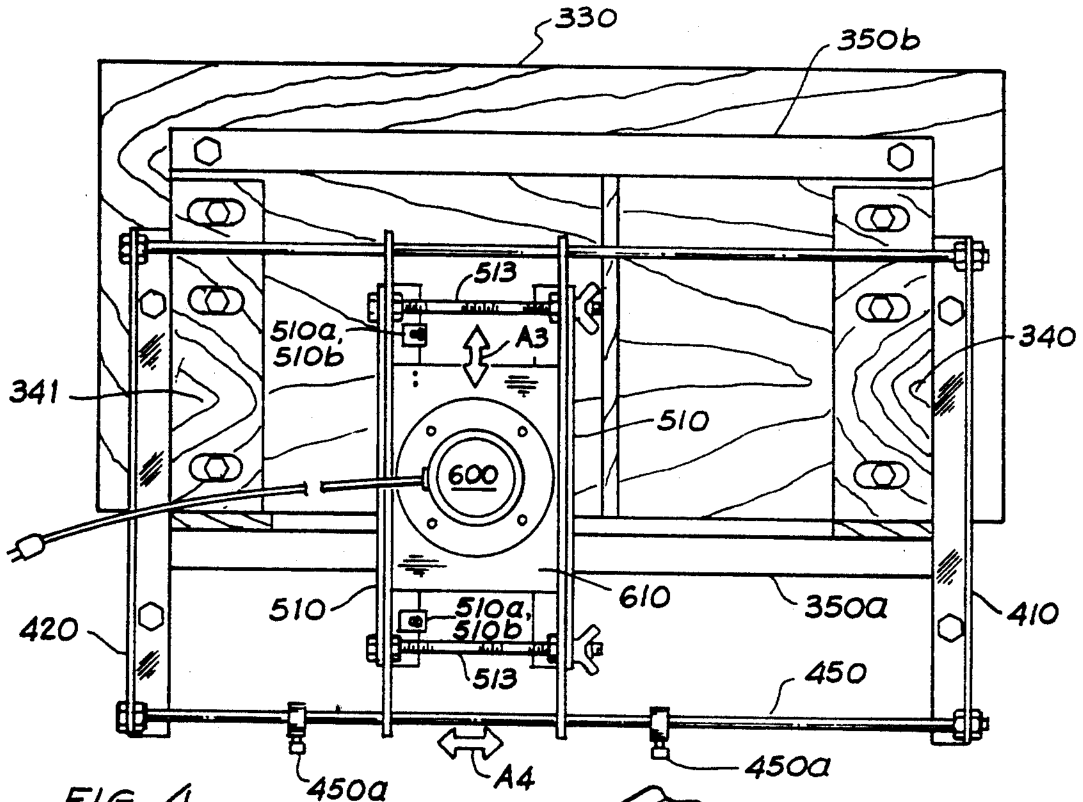
FIG. 4
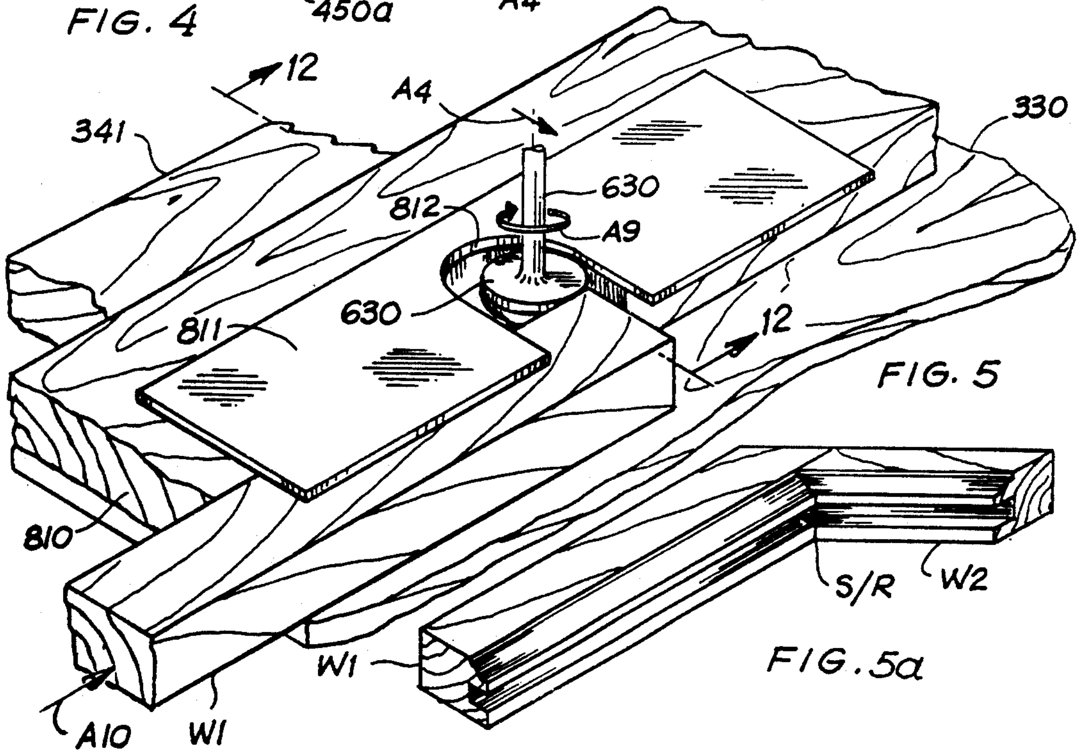
FIG. 5
FIG. 5a

PRECISION WOOD-JOINT MAKING FIXTURE APPARATUS AND METHOD OF USE WITH A ROUTER

FIELD OF THE INVENTION

The present invention relates to machine fixtures used with woodcraft tools in the woodworking art. More particularly, the present invention relates to machine fixtures used with woodcraft tools to make wood-joints, wood molding designs and geometric designs on furniture. Even more particularly, the present invention relates to machine fixtures used with a router to make a variety of wood-joint cuts, wood molding cuts and geometric design cuts on furniture.

BACKGROUND OF THE INVENTION

The prior art teaches that a router is the woodcraftsman's choice of tools for making wood-joints, specialty geometric wood cuts and molding designs. The prior art also teaches that a woodcraftsman must also have an inventory of fixtures if he, or she, is going to be able to manipulate a wood workpiece, or workpieces, to produce a variety of desired types of wood cuts for making a variety of wood-joints, or a variety of molding designs. The inventory of fixtures may include jigs for making any one of the following types of wood-joints: dovetail joints (see FIG. 6*a*), box joints (see FIG. 8), dado joints, dovetail-dado joints, rabbet joints (see FIG. 9), combination rabbet and dado joints, mortise and tenon joints, mortise and mortise joints, biscuit joints, lap joints, cross lap joints, end lap joints, dowel joints, spline joints, tongue and groove joints and stile and rail joints. Other fixtures and accessories in the inventory may include separate jigs for making molding cuts, panel raising and chamfering on the wood workpieces, or dedicated router accessories, as taught by U.S. Pat. Nos. 4,114,664 and 4,185,671, which teach using a table structure for manipulating a router to facilitate cutting a design on a workpiece such as cabinet door panels. Needless to say, the inventory of jigs becomes unmanageable, and more than likely non-existent in most woodworking shops, especially considering their individual costs, see generally the following publications for examples of commercially available jigs, (Leigh Dovetail Jig Models D1258R-12/24 and Multiple Mortise and Tenon Attachment Models MMTA-12/24, pages 4 and 10, Leigh Woodworking Jigs and Accessories 1992 Catalog, Leigh Industries Ltd, Port Coquitlam, B.C., Canada), (Leigh Dovetail Jig Models D1258R-12/24, page 70, INCRA Jig, page 49, Dowelling Jig, Models G1662/G1874, page 67, 1991 Catalog, Grizzly Imports, Inc., Williamsport, Pa., U.S.A), (Dovetail Router Jig, page 15, Fall 1990, Woodsmith Catalog Number 70, Woodsmith Catalog, Des Moine, Iowa), and (The REBEL router table Model G2894, page 16, Grizzly Press, Summer 1992, Grizzly Imports, Inc. Bellingham, Wash. Even assuming that a woodworking shop is fortunate to have such an inventory of jigs (homemade or store bought), and aside from the single function limitation of the jigs, the quality of the work is highly dependant upon the skillful hands of the woodworker to maneuver the router on the workpiece. These single function jigs require that the woodworker physically hold and freehand maneuver the router during the cutting operation, a task which most likely will produce a large number of undesirable cutting errors, and a pile of scrap lumber. See the following publications for examples of router bits used in conjunction with the fixtures to make the variety of wood-joint and molding cuts: (Router Bits, pages 99-102, 1991 Catalog, Grizzly Imports, Inc., Williamsport, Pa., U.S.A), and (Router Bits, pages 73 and 74, 1990-91 Catalog, The Woodworker's Store, Rogers, Minn.)

As discussed above, the known machine fixtures that are used to make wood-joints are limited in that they are a single function device. The wood-joint making devices are also limited in that the router must be used freehand without any complementary structure for minimizing human error resulting from the freehand use, see generally the Leigh Dovetail Jig Models D1258R-12/24 and Multiple Mortise and Tenon Attachment Models MMTA-12/24, pages 4 and 10, Leigh Woodworking Jigs and Accessories 1992 Catalog, Leigh Industries Ltd, Port Coquitlam, B.C., Canada. Similarly, prior art patents teaches router attachments that are used to form molding cuts, but that depend on the steady hand of the woodworker, see generally U.S. Pat. No. 2,756,785. While the prior art does teach apparatus for supporting and guiding a router, see U.S. Pat. Nos. 4,735,531, 4,434,824 and 2,752,961, their teachings are limited for use with a particular workpiece, such as for cutting acoustic tile, as taught by U.S. Pat. No. 4,735,531, or for use with a large workpiece such as a tree trunk as taught by U.S. Pat. No. 4,434,824, or restrictively combined with a clamping means such as the crank-type clamping means taught by U.S. Pat. No. 2,752,961. An additional limitation in these prior art devices being the absence of control structure to precisely manipulate the router, not withstanding the teaching of supporting a router on a guide assembly. Further, while more modern approaches for solving the problem of having to contend with a plurality of fixtures for making various furniture cuts include specialized computerized programmable table structure to accommodate a variety of workpieces, see U.S. Pat. No. 4,946,149, none of the approaches known have addressed the problem associated with having to contend with multiple fixtures associated with making wood-joints, wood molding and with making geometric designs.

Thus, a need is seen to exist for a precision machine fixture which is readily and easily converted from a setup for cutting one type of wood-joint cut, wood molding, or geometric design to another setup for cutting another type of wood-joint cut, wood molding, or geometric design by merely changing the cutting device, such as a bit on a router.

A need is also seen to exist for a precision machine fixture that provides a means for simultaneously or consecutively cutting both parts of a wood-joint to be formed, which wood-joint can be selected from any one of different types of wood-joints, comprising by example, mating mortise and tenon, dado lap joints, dovetail joints, mating box joints, and mating rabbet joints, without a time consuming task, other than changing the router bit or installing another workpieces for the mating joint.

A need is also seen to exist for a precision machine fixture as described above which not only provides a guided support for freehand control of a router, but that also provides manual or motorized means to bi-directionally control the positioning and maneuvering of the router over the workpiece, which is provided with structure for securing multiple workpieces to a table structure to make a variety of wood-joints, which is provided with an accessory for cutting a geometric design on a workpiece using a template attached to the fixture, and which includes vertical adjustment structure for facilitating a more precise manner of vertical adjustment of the router carriage with respect to the table work surface.

SUMMARY OF THE INVENTION

Accordingly, the primary object of the present invention is to provide a precision machine fixture which is readily and easily converted from a setup for cutting one type of wood-joint cut, wood molding, or geometric design to another setup for cutting another type of wood-joint cut, wood molding, or geometric design by merely changing the cutting device, such as a bit on a router, in accordance with all of the foregoing needs.

The foregoing objects are accomplished by providing a a fixture which combines structure for facilitating precision-controlled positioning of a woodworking tool, such as a router, about at least one wood workpiece which is part of a particular interlocking wood-joint to be formed. The precision wood-joint making fixture facilitates making a plurality of the common wood-joints including, but not limited to dovetail joints (see FIG. 6*a*), box joints (see FIG. 8), dado joints, dovetail-dado joints, rabbet joints (see FIG. 9), combination rabbet and dado joints, mortise and tenon joints, mortise and mortise joints, biscuit joints, lap joints, cross lap joints, end lap joints, dowel joints, spline joints, tongue and groove joints and stile and rail joints. The fixture includes a router carriage adapter plate, a double-layered work table, a router carriage, a router positioning adjustment for the X-direction and Y-direction. The fixture includes side and top workpiece clamps and table mount fences. Auxiliary items included are a top mount workpiece guide/fence, large workpiece clamping means, and a geometric design attachment. The router carriage adapter plate is adaptable for being fastened onto an existing router after removal of the base plate to convert the router for use with the apparatus of the present invention. The router being mounted onto the router carriage which is mounted transversely onto opposing end members of a primary frame which mounts to the double-layer work table. The router includes adjustment in the Z-direction, while the present invention adds X and Y direction controls using calibrated threaded bolt stock (by example, 16 threads per inch or 1/16th of an inch per turn of the bolt). The invention includes stops on the opposing end members, also referred to as traverse rods, supporting the router carriage assembly, as well as on the router carriage rails to enhance the router's capabilities for controllably working on the workpiece, either in a freehand manner or using the provided threaded mechanical controls. To assure squareness of the router carriage assembly with respect to the work surface the apparatus includes Z-direction jack means to adjust the height of the router above the workpiece and table mounting adjustment means for squaring in the X and Y direction. The work-table is also provided with a slot for temporary use of a miter gauge for use in conjunction with the auxiliary top mounted guide/fence when cutting molding, or for cutting, for example, stile and rail joints.

Therefore, to the accomplishments of the foregoing objects, the invention consists of the foregoing features hereinafter fully described and particularly pointed out in the claims, the accompanying drawings and the following disclosure describing in detail the invention, such drawings and disclosure illustrating but one of the various ways in which the invention may be practiced.

BRIEF DESCRIPTION OF THE DRAWINGS

FIG. 4 is another top view of the present invention taken along line 4—4 in FIG. 1, illustrating the same fixture structure for moving the second frame in the X and Y directions, designated by arrows A4 and A3, respectively, but without the mechanical means mountable to the first and second frame members.

FIG. 5 is a partial perspective view of the fixture of the present invention adapted with an auxiliary fence, illustrating a cutting operation for producing a stile member of a stile and rail wood-joint illustrated in FIG. 5*a*.

FIG. 5*a* is a partial perspective view of a stile and rail wood-joint.

DESCRIPTION OF THE PREFERRED EMBODIMENT

Figure 1:
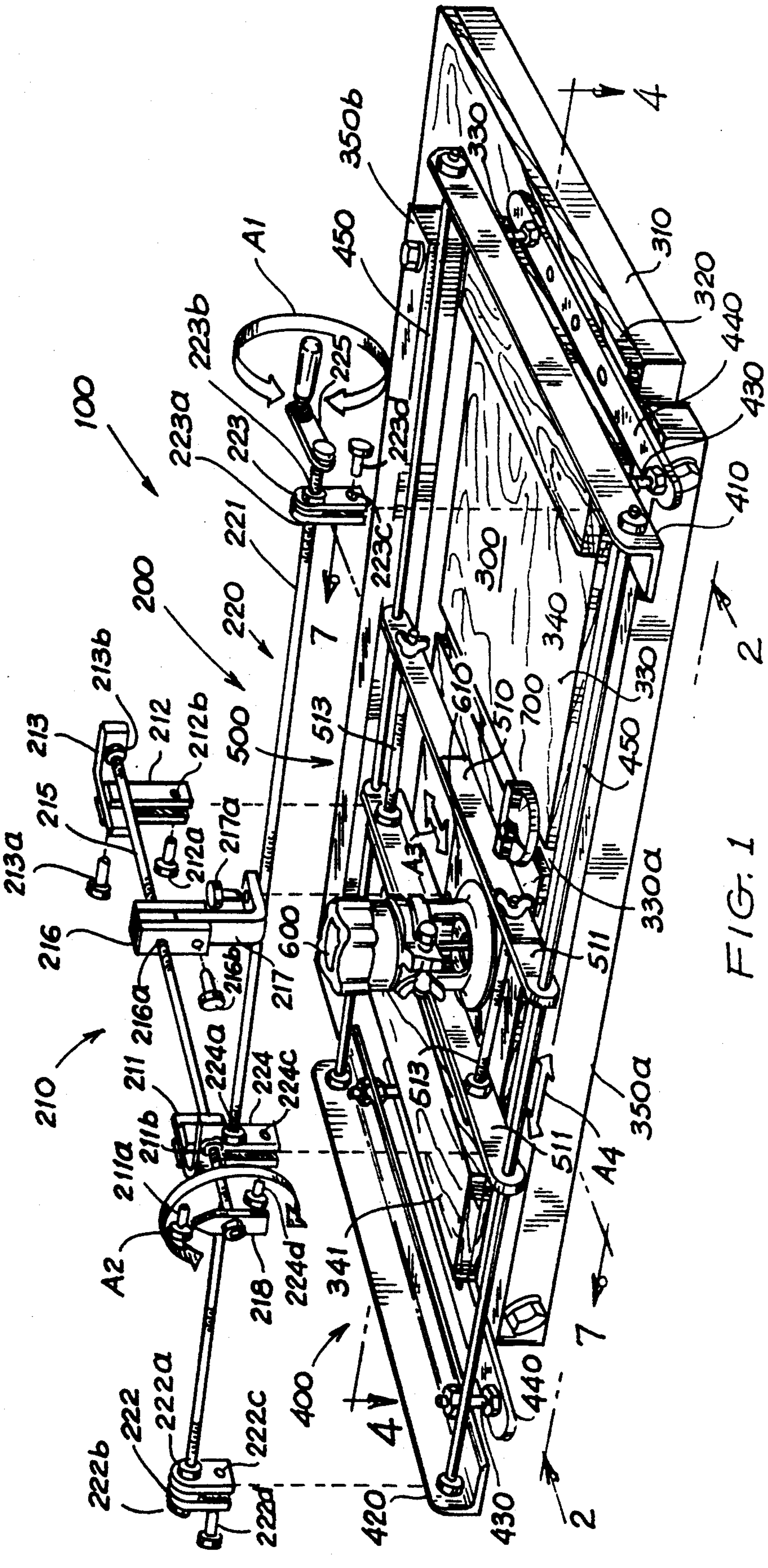
FIG. 1 is a perspective view of the present invention illustrating a table structure, a first frame member mounted to the table structure, a second frame member transversely and movably mounted to the first frame member for being maneuvered over the table work surface, and comprising a carriage means for supporting and carrying a machine tool, such as a router, and a mechanical means mountable to the first and second frame members and comprising a first calibrated positioning means for controllably positioning and manipulating the second frame member and a second calibrated positioning means for controllably positioning and manipulating the carriage means along opposing carriage support members provided on the second frame member.

Referring now to FIG. 1, showing a perspective view of a fixture apparatus 100, in accordance with the present invention, illustrated in an application for use with a router 600. Apparatus 100 is shown comprising a table structure 300, a first frame member 400, a second frame member 500 and a mechanical means 200. Table structure 300 is shown having a plurality of clamp means comprising side clamping means 350*a* and top clamping means 350*b* for clamping a plurality of workpieces to said table structure 300. Clamping means 350*a* and 350*b* facilitate clamping workpieces in orthogonal directions with respect to each other. First frame member 400 comprises first opposing end portions 440 mounted to a middle laminate 320 of table structure 300 and angle structure portions 410 and 420 which are height adjustable by jack means 430. First frame member 400 also comprises second opposing ends 450 provided in the form of smooth surface steel rods which are suspended above table structure 300. Second frame member 500 is disposed transversely and movably mounted to second opposing ends 450 for being maneuvered in an X-direction indicated by arrow A4 over work surface 330. Second frame member 500 comprising a carriage means 610 for supporting and carrying router 600 in a Y-direction indicated by arrow A3 and being adjustable within the second frame using adjustment means 513. Mechanical means 200 is mountable to first and second frame members 400, 500. Mechanical means 200 comprising a first calibrated positioning means 220 for controllably positioning and manipulating said second frame member 500 along said second opposing ends 450 and a second calibrated positioning means 210 for controllably positioning and manipulating said carriage means 610 along opposing carriage support members 510, 511, 512 provided on said second frame member 500, see also FIG. 2. First and second calibrated positioning means 220 and 210 co-act to facilitate precise positioning, operation, and utilization of router 600 on a particular workpiece.

As FIG. 1 further illustrates, said first calibrated positioning means 220 comprises first and second stationary mounts 222, 223, at least one movable mount 224, and a first elongated threaded bolt 221 having a bolt-turning-/turn-counting means 225 in the form of a crank attached at one end of bolt 221. Bolt 221 being calibrated to have a predetermined number of threads per unit distance to effect a predetermined unit of distance travelled per turn, or partial turn. Each of said first and second stationary mounts 222, 223 being detachably secured to a respective angle structure portions 420 410 via attachment means (222*c*,223*c*), (222*d*,223*d*) and having bearing supports 222*a*,223*a* for supporting opposing ends 222*b*,223*b* of said first elongated threaded bolt 221. Said at least one movable mount 224 being detachably secured to said second frame member 500 at traverse rod attaching member 511 via attachment means 224*c*, 224*d* and being in mechanical alignment with said first and second stationary mounts 222,223. Said at least one movable mount 224 being threadedly engaged at threaded hole 224*a* with said first elongated threaded bolt 221 to effect controlled positioning and manipulation of said second frame member 500 along second opposing ends 450 in accordance with a distance travelled per turn, or partial turn of crank 225, and which corresponds to the predetermined number of threads per unit distance provided on bolt 221, as bi-directionally indicated by arrow A1.

Figure 6:
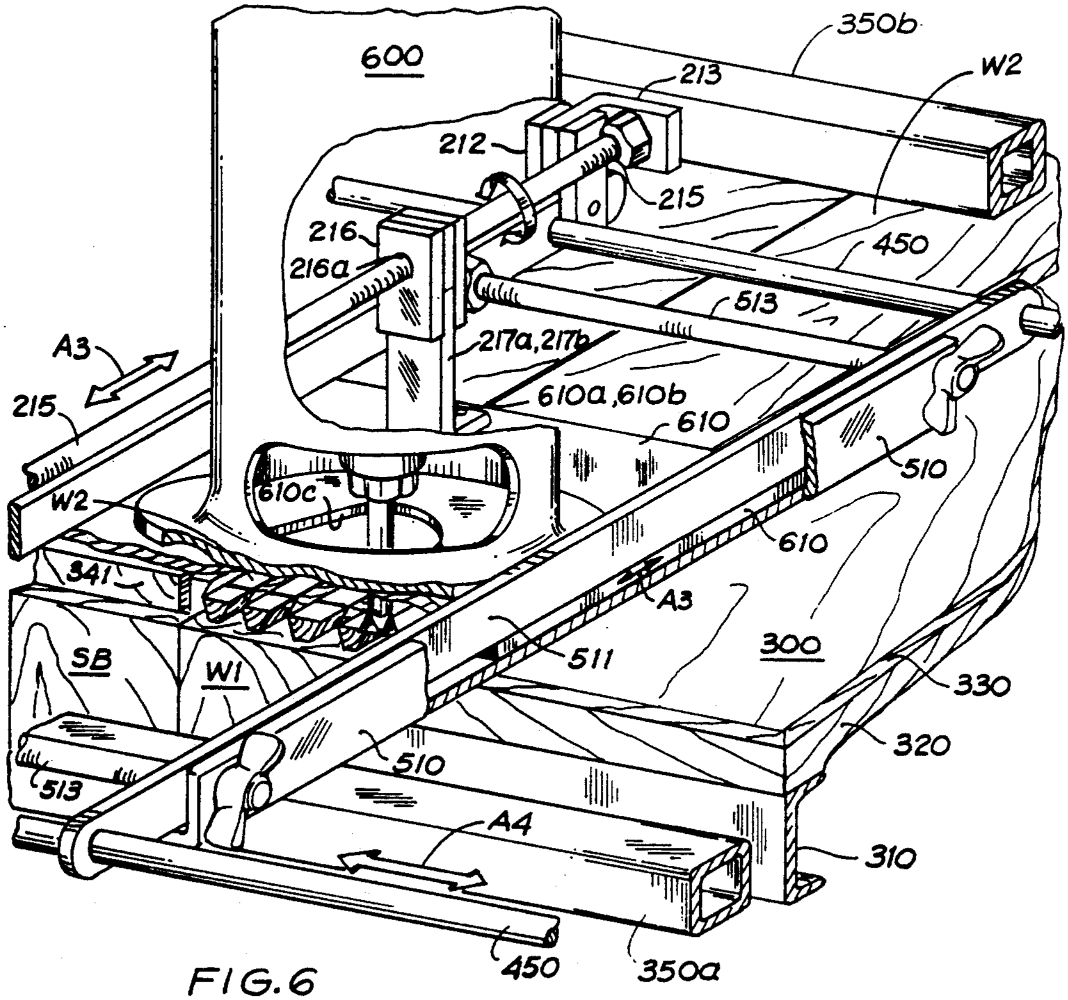
FIG. 6 is a partial perspective view of the fixture of the present invention, illustrating a cutting operation for simultaneously producing both wood cuts on workpiece members of a dovetail wood-joint illustrated in FIG. 6*a*, and also illustrating the laminated table structure and the second calibrated positioning means.

Also, as further illustrated in FIG. 1, and in FIG. 6, second calibrated positioning means 210 comprises first and second carriage frame mounts 211,(212,213), at least one movable carriage mount 216, and a second elongated threaded bolt 215 having a bolt-turning/turn-counting means 218 attached at one end of bolt 215. Bolt 215 also being calibrated to have a predetermined number of threads per unit distance to effect a predetermined unit of distance travelled per turn, or partial turn. First carriage frame mount 211, by example, is shown secured using attachment means 211*a* to movable mount 224 which is attached to transverse end member 511 of second frame member 500. First carriage mount 211 is provided with bearing support 211*b* for supporting an end of bolt 215. Second carriage frame mount portion 212 is shown mountable, using attachment means 212*a*,212*b*, to transverse end member 511 of second frame member 500. Second carriage mount portion 213 is attached to portion 212 using attachment means 213*a* and is also provided with bearing support 213*b* for supporting another end of bolt 215. Said at least one movable carriage mount 216 being attached to mounting bracket portion 217 using attachment means 216*b*, which bracket 217 being detachably secured, using attachment means 217*a* to said carriage means 610 at attachment point 610*a* using attachment means 610*b*, see also FIG. 6. Carriage mount 216 being in mechanical alignment with bearing supports 211*b*, 213*b*. Carriage mount 216 also being threadedly engaged at 216*a* with said second elongated threaded bolt 215 to effect controlled positioning and manipulation of said carriage means 610 along said opposing carriage support members 510, 512 provided on said second frame member 500. The precision of positioning being facilitated in accordance with the calibrated unit of distance travelled per turn which corresponds to a predetermined number of threads per unit distance, as indicated by arrow A2.

As further illustrated in FIG. 1 table structure 300 comprises a laminated structure comprising work surface 330 and at least one underlying structure 320 which is used for mounting said first opposing ends portions 440. A base table structure 310 is shown constructed using, by example, channel iron material, see also FIG. 6. Work surface 330 having a pair of opposing fence members 340, 341 adjustably mounted to aid in retaining a workpiece in place during a work operation. Work surface 330 is also provided with an engagement means 330*a* for facilitating selective use of an auxiliary hand tool, such as a miter gauge 700 having slide portion 701 (see FIG. 5*b*) co-acting on a workpiece during a work operation, such as when cutting a rail member of a stile and rail wood-joint.

Figure 2:
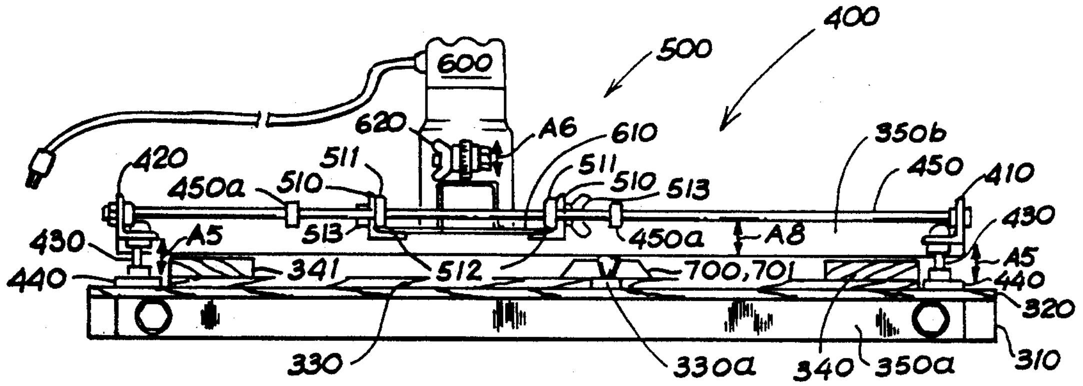
FIG. 2 is a front view of the table structure, the first frame member and the second frame member, taken along lines 2—2 in FIG. 1, and illustrating the height adjustment means, the side clamping means, one of the opposing traverse rod ends suspended above the table structure provided for moving the second frame member.

FIG. 2 shows a side view of the fixture 100 illustrating second frame member 500 mounted to first frame member 400 which is secured to table laminate portion 320 via mounting plate 440, and whereby the angle structure portions 410 and 420 and second opposing ends 450 are height adjustable, as indicated by arrow A5, using jack means 430. The Z-direction adjustment provided by router 600 using adjustor 620, is indicated by arrow A6. The rear clamp means 350*b* is shown to have clamping capability as indicated by arrow A8. The slide action of carriage means 610 is facilitated by the overlay fit of opposing plates 511 over opposing horizontal angle structure portions 510,512 and the tightness adjustment facilitated by adjustment bolt 513. Also illustrated in FIG. 2 are stop members 450*a* which are preferably, selectively attached to second opposing ends 450 for selectively limiting travel of second frame member 500. Also shown in FIG. 2 is base table structure 310, work surface 330, side clamping means 350*a*, opposing fence members 340, 341, engagement means 330*a*, miter gauge 700 and slide portion 701.

Figure 7:
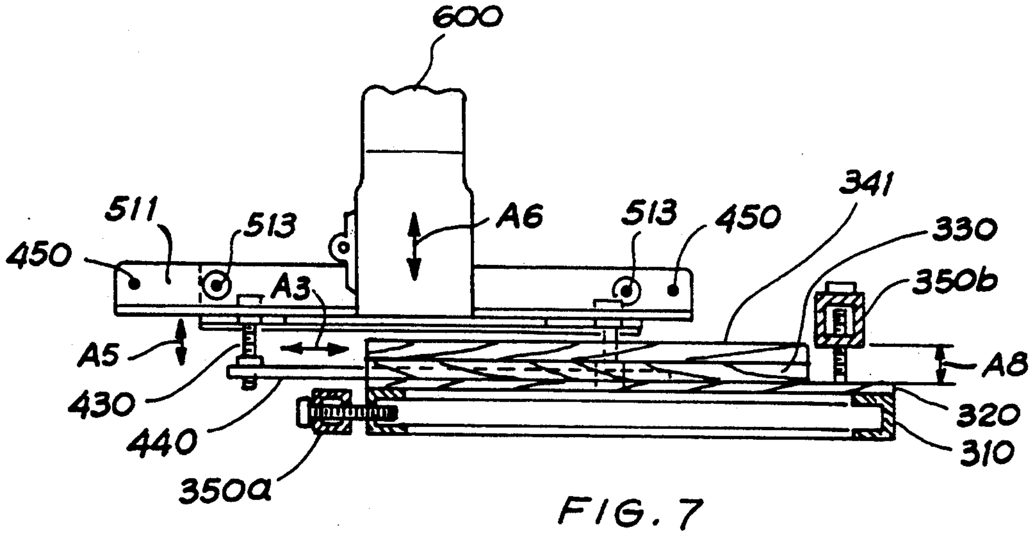
FIG. 7 is a cross-sectional view of the present invention taken along line 7—7 in FIG. 1, illustrating in particular the top and side workpiece clamps, the laminated table structure and the router carriage.

FIG. 7 is a cross-sectional view of table structure 300, frame 400 and frame 500, taken along line 7—7 in FIG. 1. Shown in FIG. 7 are top and side workpiece clamps 350*a*, 350*b*, the laminated table structure 310, 320, 330 and jack means 430 which are used to elevate members 410, 420 an equidistance from work surface 330 as indicated by arrow A5.

Figure 3:
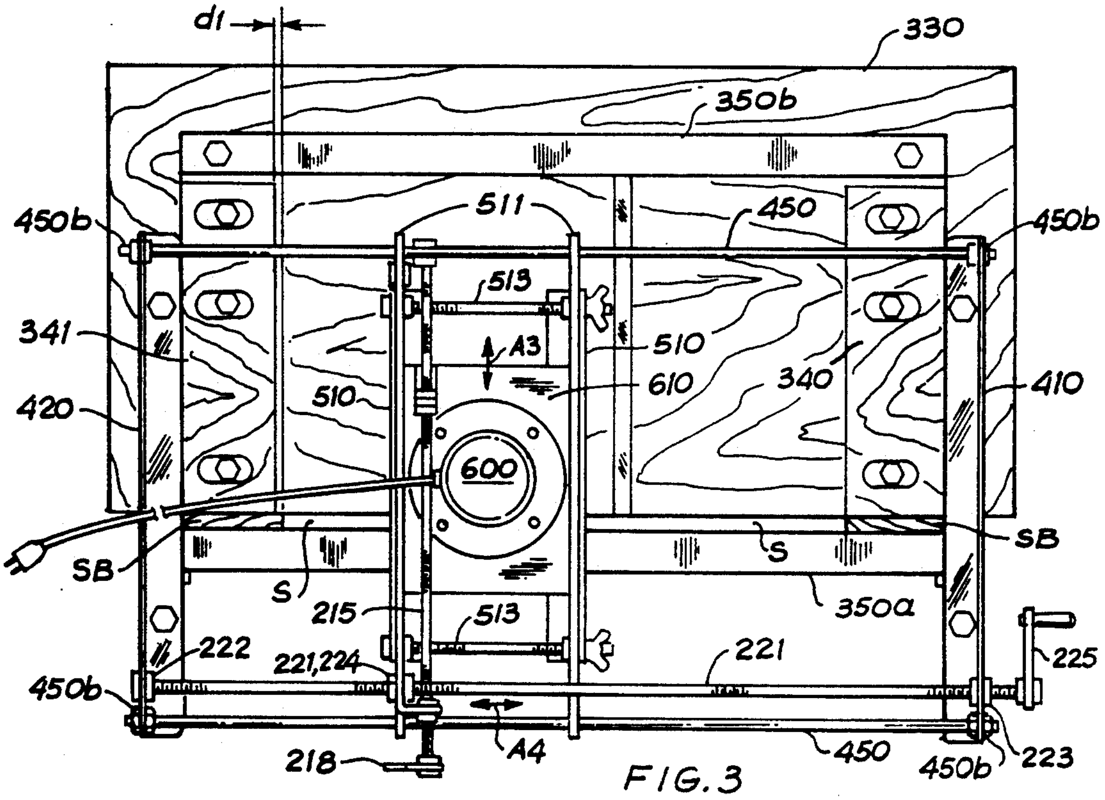
FIG. 3 is a top view of the present invention illustrating the fixture structure for moving the second frame in the X and Y directions, designated by arrows A4 and A3, respectively, illustrating in particular, the mechanical means mountable to the first and second frame members and the X and Y squareness adjustment.
Figure 11A:
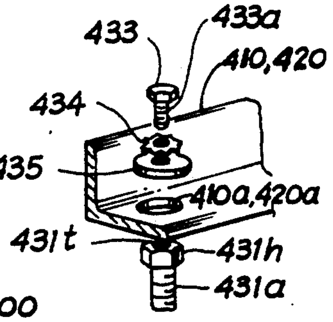
FIG. 11*a* is a partial view of the jack means illustrated in FIG. 11 further illustrating the upper fastening member having a threaded portion that engages a threaded bore on the wrench head of the lower jacking bolt.
Figure 11:
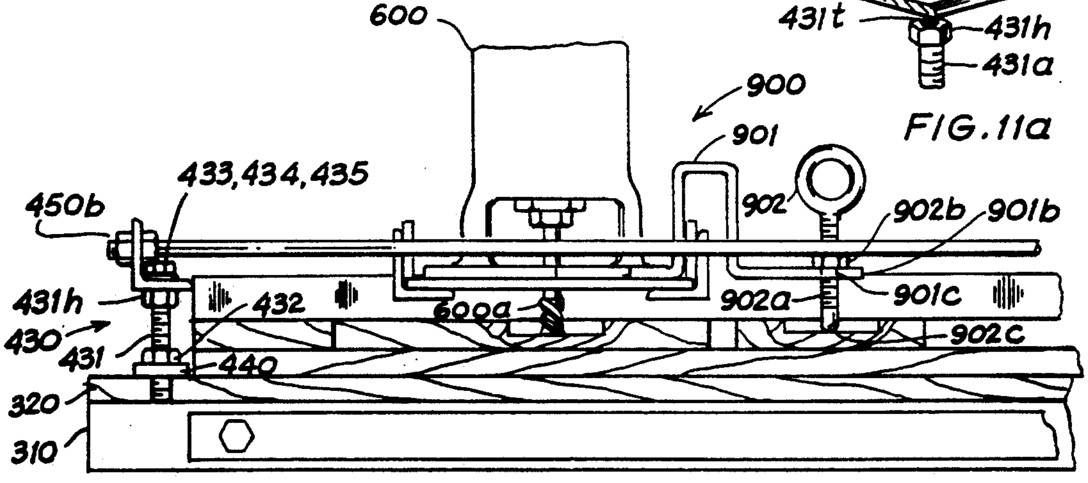
FIG. 11 is an end view of the fixture illustrated in FIG. 10 further illustrating the extension's pin member acting on the template and also illustrating the attachment detail of the jack means.
Figure 14:
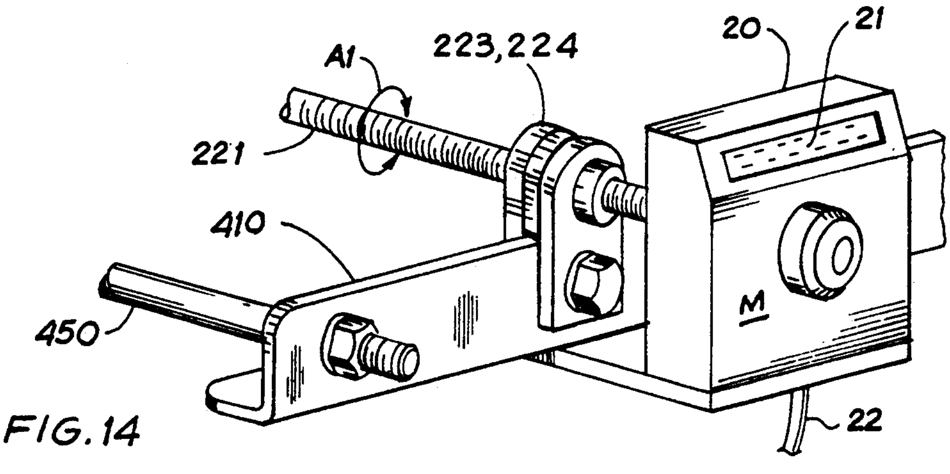
FIG. 14 is a partial perspective view of an optional bi-directional motorized means for turning the mechanical means mountable to the first and second frame members and having a turns counter display, shown by example mounted to the X-direction calibrated positioning means.

FIG. 3 illustrates a top view of fixture 100 with mechanical means 200 mounted to the first and second frame members 400 and 500, respectively, also illustrated are the X and Y squareness adjustments 450*b*, see FIGS. 3 and 11. As illustrated in FIG. 3, frame 500 is supported on frame 400 by means of traverse rods 450 and movable thereon by turning crank 225 to cause X-direction movement, as designated by arrow A4. Similarly, carriage means 610, carrying router 600, is supported on angle member (510,512) and moveable thereon by turning means 218 to cause Y-direction movement, as indicated by arrow A3. Turning means 218 is preferably not a crank device, such as crank 225, but rather a short bar, as shown in FIG. 1, to facilitate turning bolt 215 axially with bolt 215, to prevent an otherwise up and down movement caused by a cranking action. As shown in FIG. 14, an optional feature of the present invention includes a bi-directional motorized means M, packaged within enclosure 20 and controlled via electrical interface 22, for turning, by example, first elongated threaded bolt 221 member of the mechanical means, as indicated by arrow A1. Motorized means M includes a turns counter display 21 for indicating the number of turns on bolt 221 which correlates to the amount of calibrated travel in the X-direction due to the pre-determined number of threads per unit distance on bolt 221. It should be apparent that the same type of motorized control may be utilized for Y-direction positioning member 210. Also, while not shown, a turns counter such as a cyclometer may be utilized for counting the number of turns on turning means 218 and 225 when manually positioning frame 500 and carriage 610.

Also shown in FIG. 3 is rear clamping means 350*b* and vertical clamping means 350*a*. Shown also, are stop blocks SB, a left stop block being offset a distance d1 from fence 341 to effect cutting simultaneous wood-joint members, as best seen in FIG. 6. Stop blocks SB create a space S which facilitates placement of a workpiece in a vertical manner for being clamped by clamping means 350*a*. Clamping means 350*b* facilitates clamping a workpiece in a horizontal direction.

FIG. 4 is another top view of the present invention taken along line 4—4 in FIG. 1, illustrating free hand movement of second frame 500 in the X and Y directions, designated by arrows A4 and A3, respectively. Also illustrated in FIG. 4 are stop members 450*a* which are preferably, selectively attached to second opposing ends 450 for selectively limiting travel of second frame member 500. Similarly, stop members (510*a*,510*b*) which are preferably, selectively attached to second opposing ends 512 for selectively limiting travel of carriage means 610.

Figure 6A:
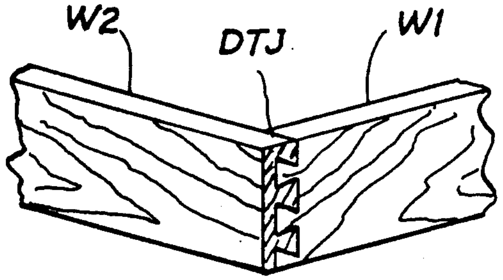
FIG. 6*a* is a partial perspective view of a typical dovetail wood-joint which can be made using the present invention.
Figure 8:
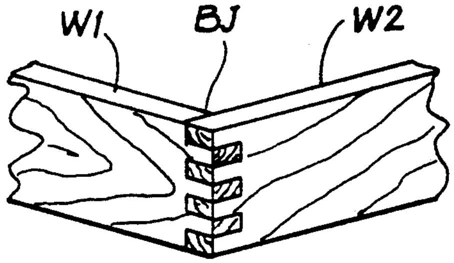
FIG. 8 is a partial perspective view of a typical box wood-joint which can be made using the present invention.

In operation, and by example only, FIG. 6 illustrates a cutting operation for simultaneously producing both wood cuts on workpiece members W1 and W2 of a dovetail wood-joint illustrated in FIG. 6*a*. Here, a workpiece W1 is positioned vertically an clamped against SB, note the offset distance shown in FIG. 3. A workpiece W2 is butted against fence 341 and against workpiece W1 and clamped rearwardly by clamping means 350*b*. Router 600 is provided with the suitable bit for cutting a dovetail wood-joint. Carriage plate 610 is provided with an enlarged opening 610*c* which aids in viewing the router bit. The specific details of maneuvering the router to cut the dovetail wood-joint are not discussed herein, as they are believed to be well known to the woodworking craftsman. However, it should be appreciated that the incremental maneuvering to simultaneously produce the individual interlocking dovetail joints, is facilitated by the first and second calibrated positioning means 210, 220 for controllably positioning router 600 as the cut are produced on workpieces W1, W2. FIG. 6*a* shows a dovetail wood-joint DTJ which can be made using the present invention. Similarly, FIG. 8 shows a typical box wood-joint BJ which can also be made using a different router bit.

Figure 5B:
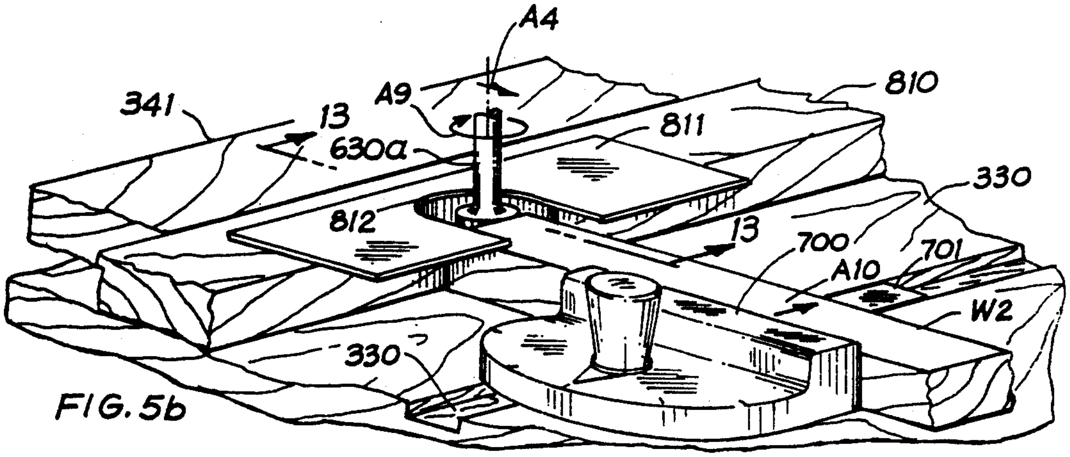
FIG. 5*b* is a partial perspective view of the fixture of the present invention adapted with an auxiliary fence and a miter gauge auxiliary tool, illustrating a cutting operation for producing a rail member of the stile and rail wood-joint illustrated in FIG. 5*a*.
Figure 9:
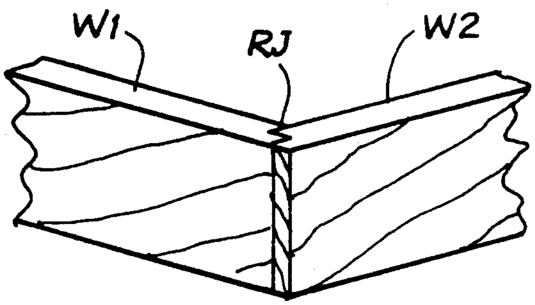
FIG. 9 is a partial perspective view of a typical rabbet wood-joint which can be made using the present invention with a suitable router bit.
Figure 12:
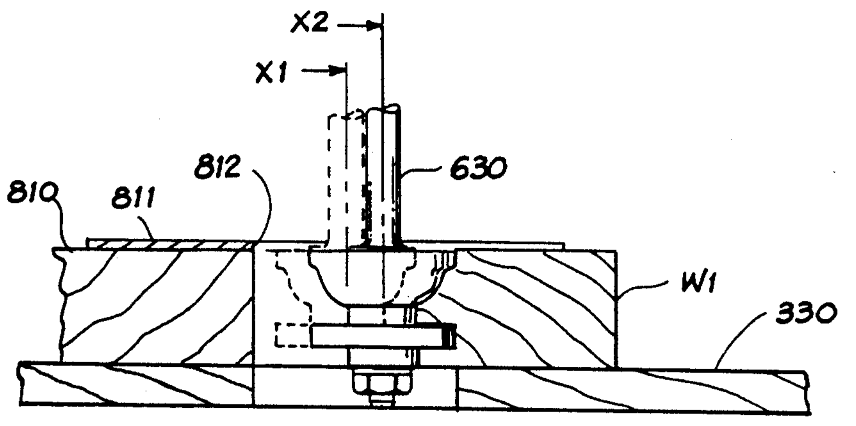
FIG. 12 is a cross-sectional view of the workpiece and the cutting operation for producing a stile member of a stile and rail wood-joint taken along line 12—12 in FIG. 5.
Figure 13:
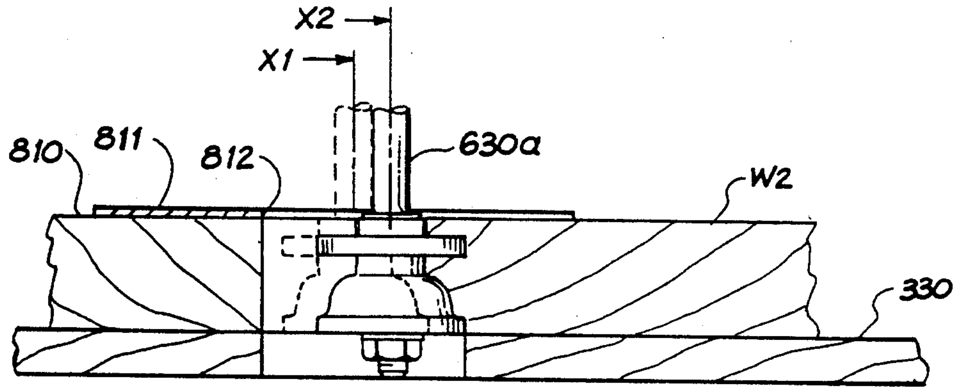
FIG. 13 is a cross-sectional view of the workpiece and the cutting operation for producing a rail member of a stile and rail wood-joint taken along line 13—13 in FIG. 5*b*.

FIG. 5 shows fixture 100 adapted with an auxiliary fence 810 provided with an overlapping plate 811 having a cutout 812 for parking router bit 630 prior to activating a wood cutting operation. As shown, the setup can be used for cutting a single workpiece W1, such as for producing a stile member of a stile and rail wood-joint S/R illustrated in FIG. 5*a*. In operation, and by referring both to FIG. 5 and to FIG. 12, router bit 630 turns as indicated by arrow A9 and is moved in the A4 direction, from position X1 to position X2. Workpiece W1 is then urged in the direction indicated by arrow A10 to effect a cut as shown for W1 in FIG. 5*a*. Similarly, as seen in FIG. 5*b*, and after appropriately changing router bit 630 to bit 630*a*, auxiliary fence 810 in combination with miter gauge tool 700, with slide portion 701 mounted in engagement means 330*a* are used to make a rail mating wood cut on workpiece W2 as shown in FIG. 5a. In operation, and by referring both to FIG. 5b and to FIG. 13, router bit 630a turns as indicated by arrow A9 and is moved in the A4 direction, from position X1 to position X2. Workpiece W2 is then urged in the direction indicated by arrow A10 to effect a rail cut as shown joined to W1 in FIG. 5a. FIG. 9 is a partial perspective view of a typical rabbet wood-joint RJ which can be made using the appropriate router bit.

Figure 10:
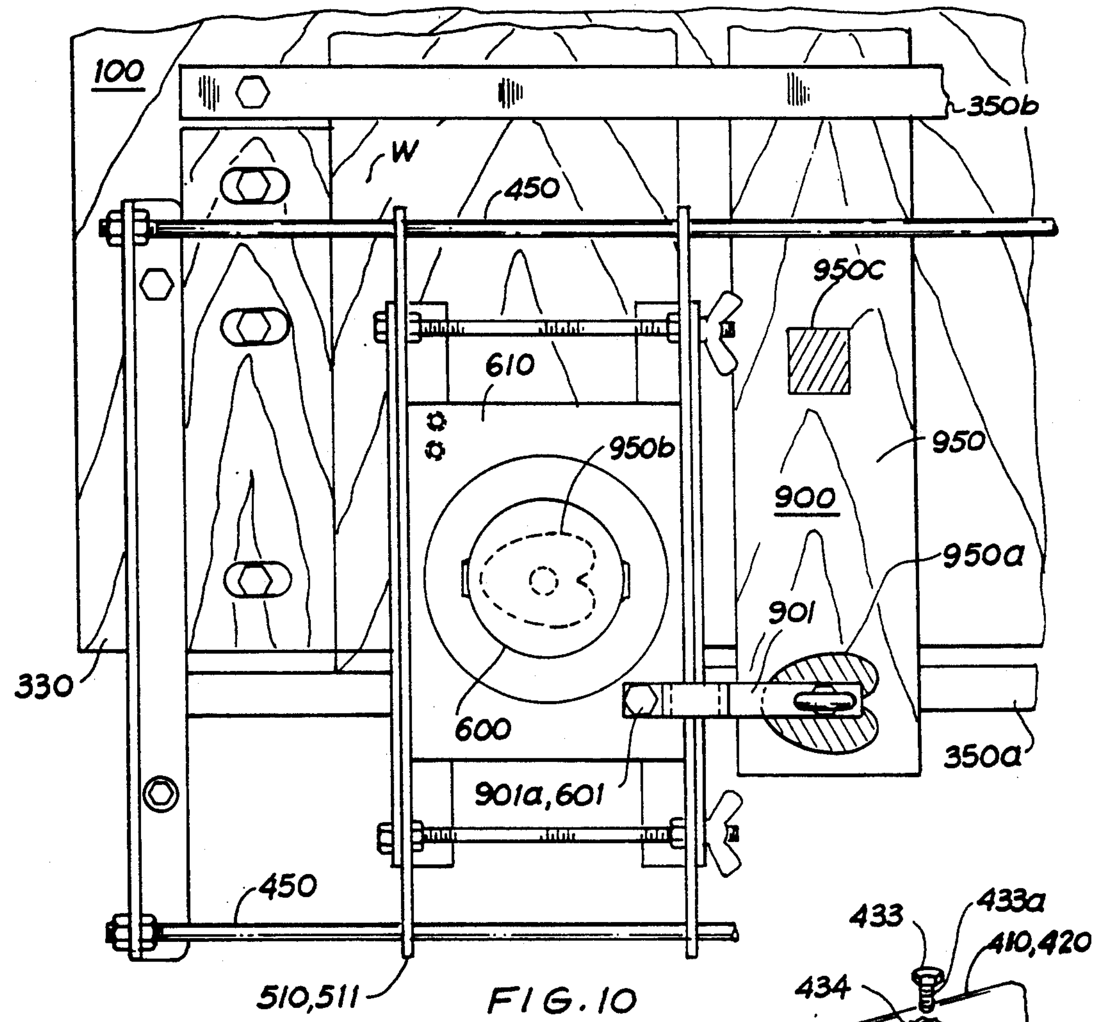
FIG. 10 is top view of the present invention adapted with an extension and a template for cutting a geometric design on a workpiece.

FIGS. 10 and 11 shows yet another feature 900 of the present invention whereby carriage plate 610 is adapted with an extension member 901 attached at end 901a with attachment means 601. Member 901 is used for mechanically interfacing with a template 950 for transferring and cutting a selected one of a plurality of geometric design 950a, 950c onto a workpiece W, such as heart shaped design cut 950b. As best seen in FIG. 10, extension member 910 is provided at a distal end 901b with a pin member 902 for co-acting with template members 950a, 950c. Pin member 902 has a pointed portion 902c, a threaded portion 902a for engaging with threaded hole 901c and a lock nut 902b. In operation, router bit 600a follows the movements that pin member 902 makes on the selected geometric designs 950a, 950c.

FIGS. 11 and 11a show the attachment details of the jack means 430. It should be appreciated that the present invention is enhanced by the vertical adjustments facilitated by jack means 430. Jack means 430 not only provides a height adjustment function, but also provides a fastening function. As shown here, lower jacking bolt member 431 is threaded onto mounting portion 440 and locked in place with lock nut 432 after reaching a desired vertical setting. Upper fastening bolt member 433, flat washer 334 and lock washer 335 secure angle structure portions 410, 420 via slightly enlarged holes 410a, 420a after X and Y adjustments have been made. To facilitate the fastening function, bolt 431 is provided with a threaded bore 431t on bolt head 431h. Upper fastening bolt 433 is of an appropriate smaller size and is provided with a threaded portion 433a for engaging within threaded bore 431t to effect the fastening function.

Therefore, while the present invention has been shown and described herein in what is believed to be the most practical and preferred embodiment, it is recognized that departures can be made therefore within the scope of the invention, which scope is therefore not to be limited to the details disclosed herein but is to be accorded the full scope of the claims so as to embrace any and all equivalent apparatus.

I claim:

1. A method of making a wood-joint, said method comprising the steps of:

(a) providing a fixture apparatus for use with a router, said apparatus comprising:

a table structure having a plurality of clamp means for clamping a plurality of workpieces to said table structure, said plurality of clamp means facilitating clamping said plurality of workpieces in appropriate directions with respect to each other for making a selected one of a plurality of wood-joints, a first frame member having first opposing ends mounted to said table structure and also having second opposing ends suspended above said table structure, said first opposing ends having a plurality of jack means for elevation said second opposing ends an equidistance from a work surface of said table structure and also having a plurality of corner adjustment means for maintaining said first and second opposing ends in orthogonal relationship with each other, and a second frame member transversely and movably mounted to said second opposing ends for being maneuvered over said work surface, said second frame member comprising a carriage means for supporting and carrying said router, said second opposing ends and said carriage means having respective stop members for being selectively attached thereto said second opposing ends and to said carriage means for selectively limiting travel of said (b) squaring said first frame member with respect to said work surface using said plurality of jack means and said plurality of corner adjustment means and facilitating unimpeded back and fourth movement of said second frame member on said second opposing ends;

(c) installing said router to a carriage plate member of said carriage means and further installing said carriage plate member onto opposing carriage supports members of said carriage means and facilitating unimpeded back and fourth movement of said plate member on said opposing carriage support members;

(d) selecting a type of wood-joint to be made, said wood-joint type being selected from a group of commonly used wood-joints comprising: dovetail joints, box joints, dado joints, dovetail-dado joints, rabbet joints, combination rabbet and dado joints, mortise and tenon joints, mortise and mortise joints, biscuit joints, lap joints, cross lap joints, end lap joints, dowel joints, spline joints, tongue and groove joints, and stile and rail joints;

(e) selecting and installing a router bit onto said router, said router bit being selected from a group of provided router bits and being suitable for making said selected type of wood-joint;

(f) clamping a plurality of wood workpiece to said table structure for making said selected type of wood-joint;

(g) positioning said installed router over said clamped workpieces and maneuvering said router for performing a cutting operation on said workpieces that will make said selected wood-joint; and (h) removing said cut workpieces and repeating said steps (d) through (g) to make other types of wood-joints.

2. A method of making a wood-joint as described in claim 1 wherein:

said step (a) of providing said fixture apparatus further includes said apparatus having a mechanical means mounted to said first and second frame members, said mechanical means comprising a first calibrated positioning means for controlling positioning and manipulating said second frame member along said second opposing ends and a second calibrated positioning means for controllably positioning and manipulating said carriage means along opposing carriage support members provided on said second frame member, said first and second calibrated positioning means co-acting to facilitate precise positioning, operation, utilization of said machine tool on a particular one of said plurality of workpieces; and said step (g) of positioning and maneuvering comprises positioning and maneuvering said installed router using said mechanical means.

3. A method of making cuts on wood, said method comprising the steps of:

(a) providing a fixture apparatus for use with a router, said apparatus comprising:
  a table structure having a plurality of clamp means for clamping at least one workpiece to said table structure, said plurality of clamp means facilitating clamping said at least one workpiece in an appropriate direction with respect to another workpiece for making a selected type of wood cut,
  a first frame member having first opposing ends mounted to said table structure and also having second opposing ends suspended above said table structure,
    said first opposing ends having a plurality of jack means for elevating said second opposing ends an equidistance from a work surface of said table structure and also having a plurality of corner adjustment means for maintaining said first and second opposing ends in orthogonal relationship with each other, and
  a second frame member transversely and movably mounted to said second opposing ends for being maneuvered over said work surface, said second frame member comprising a carriage means for supporting and carrying said router, said second opposing ends and said carriage means having respective stop members for being selectively attached thereto said second opposing ends and to said carriage means for selectively limiting travel of said second frame member and said router;

(b) squaring said first frame member with respect to said work surface using said plurality of jack means and said plurality of corner adjustment means and facilitating unimpeded back and forth movement of said second frame member on said second opposing ends;

(c) installing said router to a carriage plate member of said carriage means and further installing said carriage plate member onto opposing carriage supports members of said carriage means to facilitate unimpeded back and forth movement of said plate member with said installed router on said carriage support members;

(d) selecting a type of wood cut to be made, said type of wood cut being selected from a group of wood cuts comprising wood-joint cuts, molding cuts and geometric design cuts;

(e) selecting and installed a router bit onto said router, said router bit being selected from a group of provided router bits and being suitable for making said selected type of wood cut;

(f) clamping at least one wood workpieces to said table structure for making said selected type of wood cut;

(g) positioning said installed router over said clamped workpiece and maneuvering said router for performing a cutting operation on said at least one workpiece that will make said selected wood cut; and (h) removing said at least one cut workpiece and repeating said steps (d) through (g) to make other types of wood cuts.

4. A method of making a wood cut as described in claim 3 wherein:
  said step (a) of providing said fixture apparatus further includes providing said apparatus having a mechanical means mounted to said first and second frame members, said mechanical means comprising a first calibrated positioning means for controllably positioning and manipulating said second frame member along said second opposing ends and a second calibrated positioning means for controllably positioning and manipulating said carriage means along opposing carriage support members provided on said second frame member, said first and second calibrated positioning means co-acting to facilitate precise positioning, operation, and utilization of said machine tool on a particular one of said plurality of workpieces; and
  said step (g) of positioning and maneuvering comprises positioning and maneuvering said installed router using said mechanical means.

5. A method of making a wood cut as described in claim 3 wherein:
  said step (e) of selecting and installing a router bit onto said router, further includes installing an extension member having a pin member disposed perpendicular to said work surface for making said geometric design cuts;
  said step (f) of clamping at least one wood workpieces to said table structure further includes clamping a template having at least one geometric design; and
  said step (g) of positioning said installed router over said clamped workpiece further includes positioning said pin member over said template and maneuvering said pin member about said at least one geometric design to simultaneously maneuver said router to perform a cutting operation that produces said at least one geometric design on said at least one workpiece.

6. A fixture apparatus for use with a machine tool, said apparatus comprising:
  a table structure having a plurality of clamp means for clamping a plurality of workpieces to said table structure, said plurality of clamp means facilitating clamping said plurality of workpieces in appropriate directions with respect to each other for making, by example, mating wood-joint cuts;
  a first frame member having first opposing ends mounted to said table structure and also having second opposing ends suspended above said table structure,
  said first opposing ends having a plurality of jack means for elevating said second opposing ends an equidistance from a work surface of said table structure and also having a plurality of corner adjustment means for maintaining said first and second opposing ends in orthogonal relationship with each other; and
  a second frame member transversely and movably mounted to said second opposing ends for being maneuvered over said work surface, said second frame member comprising a carriage means for supporting and carrying said machine tool, said second opposing ends and said carriage means having respective stop members for being selectively attached thereto said second opposing ends and said carriage means for selectively limiting travel of said second frame member and said machine tool.

7. A fixture apparatus as defined in claim 6, said apparatus further comprising:

a mechanical means mounted to said first and second frame members, said mechanical means comprising a first calibrated positioning means for controllably positioning and manipulating said second frame member along said second opposing ends and a second calibrated positioning means for controllably positioning and manipulating said carriage means along opposing carriage support members provided on said second frame member, said first and second calibrated positioning means co-acting to facilitate precise positioning, operation, and utilization of said machine tool on a particular one of said plurality of workpieces.

8. A fixture apparatus as defined in claim 7, wherein:

one of said plurality of clamping means comprises a first clamp means for clamping a first workpiece in a vertical direction with respect to said work surface and another one of said plurality of clamping means comprises a second clamp means for clamping a second workpiece in a horizontal direction with respect to said work surface;

said table structure comprises a laminated structure comprising said work surface and at least one underlying structure, said underlying structure being used for mounting said first opposing ends, said work surface having a pair of opposing fence members adjustably mounted to said work surface to aid in retaining a workpiece in place during a work operation by said machine tool, said work surface having an engagement means for facilitating selective use of an auxiliary hand tool on a workpiece during a work operation by said machine tool.

9. A fixture apparatus as defined in claim 7, wherein:

said first calibrated positioning means comprising first and second stationary mounts, at least one movable mount, and a first elongated threaded bolt having a bolt-turning/turn-counting means attached at one end and being calibrated to have a predetermined number of threads per unit distance, each of said first and second stationary mounts being detachably secured to a respective end member of said first opposing ends and having bearing supports for supporting opposing ends of said first elongated threaded bolt, said at least one movable mount being detachably secured to said second frame member and being in mechanical alignment with said first and second stationary mounts, said at least one movable mount being threadedly engaged with said first elongated threaded bolt to effect controlled positioning and manipulation of said second frame member along said second opposing ends in accordance with a unit of distance travelled per turn associated with said predetermined number of threads per unit distance;

said second calibrated positioning means comprising first and second carriage frame mounts, at least one movable carriage mount, and a second elongated threaded bolt having a bolt-turning/turn-counting means attached at one end and being calibrated to have a predetermined number of threads per unit distance, said first and second carriage frame mounts being detachably secured to a transverse end member of said second frame member and having bearing supports for supporting opposing ends of said second elongated threaded bolt, said at least one movable carriage mount being detachably secured to said carriage means and being in mechanical alignment with said first and second carriage frame mounts, said at least one movable carriage mount being threadedly engaged with said second elongated threaded bolt to effect controlled positioning and manipulation of said carriage means along said opposing carriage support members provided on said second frame member in accordance with a unit of distance travelled per turn associated with said predetermined number of threads per unit distance.

10. A fixture apparatus for use with a router, said apparatus comprising:

a table structure having a plurality of clamp means for clamping a plurality of workpieces to said table structure, said plurality of clamp means facilitating clamping said plurality of workpieces in appropriate directions with respect to each other for making, by wexample, mating wood-joint cuts;

a first frame member having first opposing ends mounted to said table structure and also having second opposing ends suspended above said table structure;

a second frame member transversely and movably mounted to said second opposing ends for being maneuvered over said work surface, said second frame member comprising a carriage means for supporting and carrying said router; and a mechanical means mounted to said first and second frame members, said mechanical means comprising a first calibrated positioning means for controllably positioning and manipulating said second frame member along said second opposing ends, and a second calibrated positioning means for controllably positioning and manipulating said carriage means along opposing carriage support members provided on said second frame member, said first and second calibrated positioning means co-acting to facilitate precise positioning, operation, and utilization of said router on a particular one of said plurality of workpieces.

11. A fixture apparatus as defined in claim 10, wherein:

one of said plurality of clamping means comprises a first clamp means for clamping a first workpiece in a vertical direction with respect to said work surface and another one of said plurality of clamping means comprises a second clamp means for clamping a second workpiece in a horizontal direction with respect to said work surface;

said table structure comprises a laminated structure comprising said work surface and at least one underlying structure, said underlying structure being used for mounting said first opposing ends, said work surface having a pair of opposing fence members adjustably mounted to said work surface to aid in retaining a workpiece in place during a work operation by said router, said work surface having an engagement means for facilitating selective use of an auxiliary hand tool on a workpiece during a work operation by said router.

12. A fixture apparatus as defined in claim 10, wherein:

said first calibrated positioning means comprising first and second stationary mounts, at least one movable mount, and a first elongated threaded bolt having a bolt-turning/turn-counting means attached at one end and being calibrated to have a predetermined number of threads per unit distance, each of said first and second stationary mounts being detachably secured to a respective end member of said first opposing ends and having bearing supports for supporting opposing ends of said first elongated threaded bolt, said at least one movable mount being detachably secured to said second frame member and being in mechanical alignment with said first and second stationary mounts, said at least one movable mount being threadedly engaged with said first elongated threaded bolt to effect controlled positioning and manipulation of said second frame member along said second opposing ends in accordance with a unit of distance travelled per turn associated with said predetermined number of threads per unit distance;

said second calibrated positioning means comprising first and second carriage frame mounts, at least one movable carriage mount, and a second elongated threaded bolt having a bolt-turning/turn-counting means attached at one end and being calibrated to have a predetermined number of threads per unit distance, said first and second carriage frame mounts being detachably secured to a transverse end member of said second frame member and having bearing supports for supporting opposing ends of said second elongated threaded bolt, said at least one movable carriage mount being detachably secured to said carriage means and being in mechanical alignment with said first and second carriage frame mounts, said at least one movable carriage mount being threadedly engaged with said second elongated threaded bolt to effect controlled positioning and manipulation of said carriage means along said opposing carriage support members provided on said second frame member in accordance with a unit of distance travelled per turn associated with said predetermined number of threads per unit distance.

13. A fixture apparatus as defined in claim 12, wherein:

said bolt-turning/turn-counting means associated with each of said first and second calibrated positioning means comprises a motorized means having bi-directional turning structure and turns counter means.

14. A fixture apparatus as defined in claim 10, wherein:

said first opposing ends comprises a plurality of jack means for elevating said second opposing ends an equidistance from a work surface of said table structure and also comprises a plurality of corner adjustment means for maintaining said first and second opposing ends in orthogonal relationship with each other; and said second opposing ends and said carriage means comprises respective stop members for being selectively attached thereto said second opposing ends and to said carriage means for selectively limiting travel of said second frame member and said router.

15. A fixture apparatus as defined in claim 10, wherein:

said first opposing ends each comprise a mount member and an upper frame member for attaching said second opposing ends and whereby a plurality of jack means are provided for elevating said upper frame member and said second opposing ends an equidistance from a work surface of said table structure, said jack means comprising an upper fastening member for securing said upper frame member and also having a threaded portion that engages a threaded bore on a wrench head member of a lower jacking bolt.

16. A fixture apparatus for use with a router, said apparatus comprising:

a table structure;

a first frame member having first opposing ends mounted to said table structure and also having second opposing ends suspended above said table structure;

a second frame member transversely and movably mounted to said second opposing ends for being maneuvered over said work surface, said second frame member comprising a carriage means for supporting and carrying said router; and a mechanical means mounted to said first and second frame members, said mechanical means comprising a first calibrated positioning means for controllably positioning and manipulating said second frame member along said second opposing ends, and a second calibrated positioning means for controllably positioning and manipulating said carriage means along opposing carriage support members provided on said second frame member, said first and second calibrated positioning means co-acting to facilitate precise positioning, operation, and utilization of said router on a particular one of said plurality of workpieces.

17. A fixture apparatus as described in claim 16, further comprising:

a motorized means having bi-directional turning structure for urging said first and second calibrated positioning means to effect said positioning and manipulating operations on said second frame member and said carriage means, respectively.

18. A fixture apparatus as described in claim 16, further comprising:

a motorized means having bi-directional turning structure for urging said first and second calibrated positioning means to effect said positioning and manipulating operations on said second frame member and said carriage means, respectively; and turns counter means for counting turns made by respective threaded bolt members associated with said first and second calibrated positioning means during said positioning and manipulating operations.

* * * * *